United States Patent [19]

Yokotsuka et al.

[11] 4,064,277
[45] Dec. 20, 1977

[54] METHOD FOR PROCESSING SOYBEANS

[75] Inventors: Tamotsu Yokotsuka; Yasuo Asao, both of Nagareyama; Masaru Matsuura; Hikotaka Hashimoto, both of Noda, all of Japan

[73] Assignee: Kikkoman Shoyu Co., Ltd., Noda, Japan

[21] Appl. No.: 601,374

[22] Filed: Aug. 4, 1975

[30] Foreign Application Priority Data

Aug. 12, 1974 Japan ................................ 49-91481

[51] Int. Cl.² ........................... A23J 1/14; A23L 1/20
[52] U.S. Cl. .................................. 426/331; 426/598; 426/634; 426/656; 426/507; 426/518; 260/123.5; 426/431
[58] Field of Search .............. 426/331, 634, 335, 431, 426/658, 507, 598, 518, 656; 260/123.5

[56] References Cited

U.S. PATENT DOCUMENTS

| 3,281,251 | 10/1966 | Templeton | 426/634 X |
| 3,510,313 | 5/1970 | Steinkraus et al. | 426/634 |

FOREIGN PATENT DOCUMENTS

| 46-36181 | 10/1971 | Japan | 426/598 |

OTHER PUBLICATIONS

Nawa et al., *Agr. Biol. Chem.*, vol. 34, No. 6, (1970), pp. 966–968.

*Primary Examiner*—Raymond N. Jones
*Assistant Examiner*—Esther M. Kepplinger
*Attorney, Agent, or Firm*—Schuyler, Birch, Swindler, McKie & Beckett

[57] ABSTRACT

Soybean milk, isolated soybean protein, concentrated soybean protein or the like soybean protein free from throat-catching sensation can be obtained when whole soybeans are processed by water soaking treatment in the presence of a competitive inhibitor for β-glycosidase.

16 Claims, No Drawings

METHOD FOR PROCESSING SOYBEANS

This invention relates to a method for processing soybeans. More particularly, the invention pertains to a method for processing soybeans to produce soybean milk, isolated soybean protein, soybean protein concentrates, defatted soybean and the like processed soybeans composed mainly of soybean protein which are extremely low in throat-catching sensation and are useful as starting materials for soybean-utilizing beverages and foods.

Soybeans have been known from old times as an excellent protein supply source. With recent spontaneous increase in world population, the importance of security of protein resources has come to be recognized, and the advantageous productivity of soybeans and the excellent functional properties of soybean protein have come to be highly evaluated. In order to expand the uses of soybeans, various processing methods have been developed. Typical examples of such methods are a method in which soybeans such as whole soybeans or defatted soybeans are ground in the presence of water and then extracted with water to obtain a suspension of soybean protein, i.e. soybean milk; a method in which the protein of soybeans is dissolved in water, a dilute acid, alkali or salt, and is then isoelectrically precipitated to obtain isolated soybean protein; and a method in which soybeans are modified to insolubilize the protein thereof, and other ingredients than the protein are removed by water-washing to increase the protein concentration, thereby obtaining soybean protein concentrates. The thus obtained processed soybeans composed mainly of soybean protein have been used as starting materials for various beverages and foods such as, for example, protein beverages, ice creams and the like foods corresponding to beverages, processed foods using soybean protein as substitute for meat protein, and processed foods prepared by blending meat foods with soybean protein. However, the processed soybeans obtained in the above manner have such serious disadvantage that they are marked in throat-catching sensation particularly when used as beverages, and ice creams and the like products corresponding to beverages.

With an aim to overcome the above-mentioned disadvantage, the present inventors conducted extensive studies to attain such novel finding that when, at the time of extraction treatment of soybean protein, whole soybeans are brought into contact with water or tissues of whole soybeans are mechanically destroyed under conditions where no water is added, $\beta$-glycosidase contained in the whole soybeans reacts with a substrate, i.e., polyphenol glycosides of the soybeans to form poylphenols, e.g. daidzein and glycitein, with the result that the throat-catching sensation increases; that the throat-catching sensation, which has once been produced, does not disappear; and that the said phenomenon can be inhibited when the aforesaid treatment is carried out in the presence of a competitive inhibitor for the $\beta$-glycosidase. Based on this finding, the inventors have accomplished the present invention.

An object of the present invention is to provide soybean milk, isolated soybean protein, soybean protein concentrates or the like soybean protein free from throat-catching sensation.

Another object of the present invention is to provide a novel method for producing the above-mentioned protein.

Other objects and advantages of the present invention will become apparent from the following description.

Thus, in accordance with the present invention, there is provided a method for processing soybeans which comprises subjecting the soybeans to extraction treatment to obtain soybean protein, characterized in that the said extraction treatment is carried out in the presence of a competitive inhibitor for $\beta$-glycosidase.

In soybeans used as starting materials for soybean milk, isolated soybean protein, soybean protein concentrates and the like processed soybeans composed mainly of soybean protein which include unprocessed soybeans stored in a dry state after harvest, and substantially unprocessed soybeans, e.g. hulled soybeans, whose tissues have not substantially been destroyed, $\beta$-glycosidase is present in such a state as not to react substantially with the substrates. However, when the whole soybeans are subjected to soybean protein extraction treatment by contact with water or by destruction of tissues thereof, the said $\beta$-glycosidase is quickly allowed to react with the substrates. It is therefore extremely important that the treatment of soybeans before inactivation of $\beta$-glycosidase is effected in the presence of a competitive inhibitor for the $\beta$-glycosidase.

The treatments by contact with water and by mechanical destruction of soybean tissues, which treatments are effected at the time of soybean protein extraction treatment, include, for example, soaking of starting soybeans in water, grinding of starting soybeans in the presence of water, extraction of soybean protein by use of water, a dilute aqueous solution of acid, alkali or salt, and flattening, disintegration, cracking, etc. of starting soybeans. The soybean protein extraction treatment referred to in the present invention include such mode that whole soybeans or hulled soybeans, whose tissues have not been destroyed, are subjected to defatting treatment using a non-polar solvent such as hexane, for example, and then the defatted soybeans are processed to extract soybean protein. Accordingly, the tissue destruction treatment of starting soybeans, i.e. the treatment of flattening the starting soybeans to the form of flakes or bringing them to the form of meal, should also be effected in the presence of a competitive inhibitor for $\beta$-glycosidase. Further, the term "in the presence of a competitive inhibitor" referred to herein means such state that the starting soybeans whole or hulled soybeans are impregnated with an aqueous solution of the competitive inhibitor, in the case of the water soaking treatment of the soybeans and in the case of flattening, crushing and at the time of tissue destruction treatment cracking. Furthermore, the treatment of soybeans before inactivation of $\beta$-glycosidase, which treatment is carried out in the production of soybean protein by subjecting soybeans to extraction treatment, means a treatment carried out under such conditions that the activity of $\beta$-glycosidase, measured according to an ordinary procedure, has not been lost. An example of the procedure for measuring the activity of $\beta$-glycosidase is as described below.

A definite amount of a sample, whose $\beta$-glycosidase activity is desired to be measured, is sufficiently homogenized at a pH of 6.5 to 7.0 with an appropriate amount of water (which amount is usually 5 to 15 times the weight of the sample in a dry state). The resulting mixture is adjusted to a pH of 5.0, and then centrifuged to obtain a supernatant, which is a crude enzyme solution. To 0.5 ml. of the crude enzyme solution is added 2.0 ml. (0.005 mole) of p-nitrophenyl-βD-glucopyranoside, and the resulting mixture is subjected to incubation at 30° C. for a definite period of time (e.g. 10 to 30 minutes), and then charged with 2.5 ml. (0.5 mole) of $Na_2CO_3$ to terminate enzyme reaction. The reaction liquid is measured in absorbance (O.D.) at 420 mμ, and, from this O.D. value is substracted the absorbance (O.D.) of a blank (a liquid prepared by adding 2.5 ml. (0.5 mole) of $Na_2CO_3$ and the same substrate as above to 0.5 ml. of the above-mentioned enzyme solution, and then subjecting the resulting mixture to the same incubation as above) to obtain a ΔO.D. value. From this ΔO.D. value, the amount of p-nitrophenol formed by the enzyme reaction is calculated. In case the said ΔO.D. value is zero or substantially zero, the amount of formed p-nitrophenol is zero, and thus it is understood that β-glycosidase has been inactivated. This activity measurement is carried out according to the modified method of J. E. Citti et al. [Journal of Bacteriology, Vol. 89, page 937(1965)].

Heat treatment for the complete inactivation of β-glycosidase is effected at a high temperature e.g. 80° C. for 10 minutes. Accordingly, when soybeans are desired to be processed at a temperature, 0° to 80° C., the processing is effected in the presence of a competitive inhibitor for β-glycosidase.

The competitive inhibitor for β-glycosidase, used in the present invention, is a substance which is similar in chemical structure to the substrate reactive with β-glycosidase and having a greater affinity for β-glycosidase than does the substrate so as to make the bonding of the substrate to said enzyme impossible, i.e. a substance capable of stereostructurally taking a half-chair, such as, for example, aldonic lactones or derivatives thereof (containing S or N in the lactone ring, for example) or saccharides [Advances in Enzymology and Related Areas of Molecular Biology, Vol. 36, 151–181 (1972)]. Concrete examples of said aldonic lactones are glucono-1,5-lactone, fucono-1,5-lactone, galactono-1,5-lactone, D-xylono-1,5-lacton and the like; concrete examples of said derivative of aldonic lactone are 5-acetamido-5-deoxy-D-xylopyranose, Nojirimycin and the like; and concrete examples of said saccharides are glucose, galactose, xylose and the like. It is noted that these saccharides are mono-saccharides. These may be used either singly or in admixture of two or more members. Particularly preferable among these are the aldonic lactones, which are known to be safely applicable to food processing and are marked in effectiveness.

The amount of the above-mentioned competitive inhibitor to be added varies depending on the kind thereof, but is preferably 0.1 to 2 weight % in the case of glucono-1,5-lactone, 0.02 to 2 weight % in the case of fucono-1,5-lactone, 20 to 40 weight % in the case of galactono-1,5-lactone and 40 to 100 weight % in the case of glucose, based on the weight of starting whole or hulled soybeans. Among the above-mentioned competitive inhibitors, there are some which gradually convert into other substances in aqueous solutions and thus are lowered in competitive inhibitor activity. When such competitive inhibitor is to be used, the amount thereof may suitably be decided in consideration of the above, or a proper amount thereof may additionally be supplemented during processing.

The above-mentioned amount of the competitive inhibitor to be added means the amount of the competitive inhibitor incorporated in the form of an aqueous solution into the soybeans, in the case of the water soaking treatment of the soybeans and in the case of flattening, crushing and cracking at the time of the tissue destruction treatment, and means the amount of the competitive inhibitor made present, as an aqueous solution, together with the soybeans, in the case of grinding at the time of the tissue destruction treatment.

The manner of addition of the competitive inhibitor is not particularly limited. In short, the competitive inhibitor may be added so that in the extraction of soybean protein, at least the treatment before complete inactivation of β-glycosidase is carried out in the presence of the competitive inhibitor. For example, when the extraction of soybean protein is desired to be initiated from the soaking in water of starting soybeans, there may be adopted such procedure that a proper amount of the competitive inhibitor is dissolved in water, and the starting soybeans are soaked in the resulting aqueous solution thereby incorporating the competitive inhibitor into the soybeans. Alternatively, when the extraction of soybean protein is desired to be initiated from the destruction of soybean tissues by flattening, mealing, crushing, cracking or grinding (including the destruction of soybean tissues in defatting steps), there may be adopted such procedure that a proper amount of the competitive inhibitor is dissolved in a small amount of water, and the resulting aqueous solution is added to the starting soybeans before or at the beginning of destruction of soybean tissues.

In case an aqueous solution of glucose, galactono-1,5-lactone or the like competitive inhibitor, which is required to be used in large amount, is used for the soaking treatment of starting soybeans, the penetration of the competitive inhibitor into the soybeans becomes somewhat difficult owing to osmotic pressure. However, the said competitive inhibitor can successfully be used when the extraction of soybean protein is started from the mechanical destruction of soybean tissues. Further, in case sugar-containing beverages or foods are desired to be obtained from processed soybeans composed mainly of soybean protein, the use of the aforesaid saccharides as the competitive inhibitors is quite convenient.

Several examples of general procedures for preparing processed soybeans (soybean protein) obtained by extracting protein from starting soybeans are explained below.

1. Preparation of Soybean Milk

Starting soybeans, whose tissues have not been destroyed, are swelled by soaking them for 6 to 16 hours in 2 to 5 times the weight thereof of an aqueous solution containing a proper amount of the aforesaid competitive inhibitor for β-glycosidase thereby to incorporate the competitive inhibitor into the soybeans. To the soaked soybeans is added 5 to 15 times the weight thereof of water, warm water or hot water, and the resulting mixture is sufficiently ground. In case the β-glycosidase is not completely inactivated, said ground mixture is then heated to completely inactivate β-glycosidase contained therein, and then subjected to filtration to obtain a soybean protein-containing aqueous extract (soybean milk).

Alternatively, an aqueous solution containing a proper amount of the aforesaid competitive inhibitor for β-glycosidase is added to starting soybeans in proportion of 5 to 15 times the weight of said starting soybeans. Immediately thereafter, the resulting mixture is sufficiently ground and the ground mixture is treated in the same manner as above to obtain soybean milk.

If necessary, the thus obtained soybean milk may be defatted by, for example, centrifugation. In case the defatting treatment is desired to be effected at the beginning of the protein extraction treatment, there may be adopted, for example, such procedure that starting soybeans are flattened or mealed in the presence of, for example, 5 to 20% by weight, based on the weight of the starting soybeans, of an aqueous solution containing a proper amount of the aforesaid competitive inhibitor for $\beta$-glycosidase and then subjected to defatting treatment according to an ordinary procedure using a solvent such as hexane or the like, and the resulting defatted soybeans are soaked or not soaked in water, ground in the presence of a sufficient amount of water, for example, 5 to 15 times the weight of the defatted soybeans, and then treated in the same manner as above to obtain soybean milk. Though a part or all of the competitive inhibitor used is present in the resulting defatted soybeans, there may be case where the amount of said competitive inhibitor used becomes less than the necessary amount during the above-mentioned water-soaking and grinding treatments. In this case, said competitive inhibitor should be added to effect the above-mentioned treatments.

The soybean milk obtained in the above manner may be formed into a product either as it is or in the form of a powder formed by subjecting the milk to usual spray-drying or the like.

2. Preparation of Isolated Soybean Protein

Starting soybeans are soaked for 6 to 16 hours in 2 to 5 times the weight thereof of an aqueous solution containing a proper amount of the aforesaid competitive inhibitor for $\beta$-glycosidase to incorporate the competitive inhibitor into the soybeans. The soaked soybeans are then ground in the presence of water, a dilute aqueous solution of acid, alkali or salt to solubilize the soybean protein, which is then isoelectrically precipitated (at pH 4.3 to 4.5) to obtain isolated soybean protein. When there is adopted such procedure that the starting soybeans are immediately ground without soaking in the aqueous solution, the competitive inhibitor may be added and made present at the time of grinding.

In case the defatting treatment of starting soybeans is desired to be effected at the beginning of the protein extraction treatment, there may be adopted the same procedure as described in the preceding item (1)

3. Preparation of Soybean Protein Concentrates

Starting soybeans are soaked for 6 to 16 hours in 2 to 5 times the weight thereof of an aqueous solution containing a proper amount of the aforesaid competitive inhibitor for $\beta$-glycosidase. The soaked soybeans are subjected to heat treatment such as cooking or the like to insolubilize the soybean protein, ground and then sufficiently washed with water to remove other components than the protein, thereby obtaining soybean protein concentrates. Alternatively, starting soybeans are charged with an aqueous solution containing a proper amount of the aforesaid competitive inhibitor for $\beta$-glycosidase, ground immediately thereafter, subjected to heat treatment, and then treated in the same manner as above to obtain soybean protein concentrates.

In case the defatting treatment of starting soybeans is desired to be effected at the beginning of the protein extraction treatment, there may be adopted the same procedure as described in the foregoing item (1).

If no treatment capable of inactivating $\beta$-glycosidase has been effected in the above-mentioned procedures for preparing such processed soybeans as above, it is desirable that the resulting processed soybeans are subjected to heat treatment to completely inactivate the $\beta$-glycosidase. Further, in case the processed soybeans obtained have beany odor or the like, they may be treated according to the known beany odor-removing process or other quality-improving process.

The processed soybeans composed mainly of soybean protein, which are obtained according to the method of the present invention, are not only extremely low in throat-catching sensation, as mentioned previously, but also good in mouth feel, excellent in flavor and high in quality. The processed soybeans are effectively utilizable as starting materials for various soybean protein-utilizing beverages and foods, such as soybean milk beverages, ice creams, lactic acid beverages, and ice creams and the like products corresponding to beverages, which strongly exhibit throat-catching sensation, if any.

The present invention is illustrated in more detail below with reference to examples, but the invention is not limited to the examples.

EXAMPLE 1

40 Grams of whole soybeans were swelled by soaking at room temperature for 8 hours in 80 ml. of an aqueous solution containing glucono-1,5-lactone as a competitive inhibitor for $\beta$-glycosidase in such proportion, based on the weight of the soybeans, as shown in Table 1. In this case, two thirds times the amount of said aqueous solution was incorporated into the soybeans. To the soaked soybeans was added 320 ml. of hot water (at above 95° C.), and the resulting mixture was treated by means of a homogenizer to prepare a ground suspension, which was then filtered by use of a 100-mesh sieve to obtain an extract. The temperature at the time of the homogenization treatment effected with addition of said hot water was above 90° C., and, by said treatment, $\beta$-glycosidase contained in the soybeans was completely inactivated, and the mixture was freed from beany odor (grassy smell).

The thus obtained extract (soybean milk) was subjected to organoleptic test by drinking to obtain such results as shown in Table 1.

Table 1

| Run No. | Glucono-1,5-lactone (weight %) | | $\beta$-Glycosidase inhibitory ratio (%) [2] | Throat-catching sensation [3] |
|---|---|---|---|---|
| | Amount used | Amount incorporated into soybeans [1] | | |
| 1 | 0 | 0 | 0 | > ++++ |
| 2 | 0.0015 | 0.0010 | 13 | > ++++ |
| 3 | 0.015 | 0.010 | 49 | + |
| 4 | 0.15 | 0.10 | 73 | — |

Table 1-continued

| | Glucono-1,5-lactone (weight %) | | | |
|---|---|---|---|---|
| Run No. | Amount used | Amount incorporated into soybeans [1] | β-Glycosidase inhibitory ratio (%) [2] | Throat-catching sensation [3] |
| 5 | 1.5 | 1.0 | 90 | — |

[1] Calculated from the difference between the amount of the aqueous glucono-1,5-lactone solution used and the amount of the residual solution after soaking of the soybeans.
[2] The β-glycosidase inhibitory ratio (%) was measured in the following manner: At the time of soybean soaking, in the above-mentioned operation, 0.1 weight % based on the weight of the soybeans of p-nitrophenyl-β-D-glucopyranoside was absorbed together with the soaking solution into the soybeans. After lapse of the same soaking period as mentioned previously, the soybeans were boiled in water for 5 minutes. Subsequently, the soybeans were soaked in a 2.5M sodium carbonate solution to elute p-nitrophenol which had been liberated in the soybeans due to the action of β-glycosidase. The developed yellow color was determined by using electrophotometer (420 mμ), and the ratio (%) of β-glycosidase activity remaining in each sample was subtracted from 100%, assuming as 100% the β-glycosidase activity in the sample of Run No. 1, which had not been incorporated with glucono-1,5-lactone, to obtain a value. This value was decided as the inhibitory ratio (%).
[3] The mark — shows the case where scarce throat-catching sensation was felt; the mark + shows the case where scarce throat-catching sensation was felt when the extract of Run No. 3, which had throat-catching sensation, was diluted to 10 times with the extract of Run No. 5; and the mark > + + + + shows the case where throat-catching sensation was still felt even when each of the extracts of Run Nos. 1 and 2 was diluted to 40 times with the extract of Run No. 5.

From the results shown in Table 1, it is understood that when whole soybeans are impregnated with 0.10 weight % or more of glucono-1,5-lactone based on the weight of the soybeans in the form of an aqueous solution, the activity of β-glycosidase in the soybeans is greatly inhibited, and a liquid (soybean milk) obtained by subjecting the thus processed soybeans to extraction treatment exhibits scarce throat-catching sensation.

The aforesaid operation was repeated, except that the glucono-1,5-lactone was replaced by each of the competitive inhibitors shown in Table 2, and the minimum effective amount of the competitive inhibitor based on the weight of the whole soybeans was calculated. The results obtained were as shown in Table 2.

Table 2

| Competitive inhibitor | Minimum effective amount (weight %) |
|---|---|
| Fucono-1,5-lactone | 0.02 |
| Nojirimycin | 0.01 |

EXAMPLE 2

1 Kilogram of whole soybeans were swelled by soaking for 8 hours in 2 liters of an aqueous solution containing 1.5 g. of glucono-1,5-lactone. To the soaked soybeans was added 8 liters of boiling water, and the resulting mixture was ground by means of a homogenizer to prepare a suspension. This suspension was filtered by use of a filter cloth of about 100 mesh to remove the insoluble residue, whereby 8 liters of soybean milk, which was extremely low in throat-catching sensation and smooth in mouth feel, was obtained. The temperature at the time of homogenization treatment with addition of the boiling water was more than 90° C., and thus β-glycosidase contained in the soybeans was completely inactivated.

EXAMPLE 3

Soybean milk was prepared in the same manner as in Example 2, except that the glucono-1,5-lactone was replaced by 0.3 g. of fucono-1,5-lactone. This soybean milk was spray-dried according to an ordinary procedure to obtain 700 g. of a soybean milk powder which, when dissolved or dispersed in water, could give soybean milk extremely low in throat-catching sensation and smooth mouth feel.

EXAMPLE 4

The same operation as in Example 1 was effected, except that the glucono-1,5-lactone was replaced by each of the competitive inhibitors set forth in Table 3, and the minimum effective amount of the competitive inhibitor based on the weight of the whole soybeans was calculated. The results obtained were as shown in Table 3.

Table 3

| Competitive inhibitor | Minimum effective amount (weight %) |
|---|---|
| Galactono-1,5-lactone | 20 |
| Glucose | 40 |

EXAMPLE 5

To 1 kg. of hulled soybeans, whose tissues had not substantially been destroyed, was added 10 liters of a 6% glucose solution, and the resulting mixture was immediately ground by means of a homogenizer to perpare a suspension. This suspension was filtered by use of a filter cloth of about 100 mesh to remove the insoluble residue, whereby 8 liters of soybean milk, which was extremely low in throat-catching sensation and smooth in mouth feel, was obtained. The thus obtained soybean milk was spray-dried according to an ordinary procedure to obtain 800 g. of a soybean milk powder. This soybean milk powder, when dissolved or dispersed in water, could give soybean milk extremely low in throat-catching sensation and smooth mouth feel, and thus was excellent in quality as a soybean milk powder.

EXAMPLE 6

The soybean milk obtained in Example 2 was freed from the oil portion by centrifugation, and then spray-dried according to an ordinary procedure to obtain a defatted soybean milk powder. 1 Part (by weight) of this powder was mixed with 3 parts of a skim milk powder, and the resulting mixture was used as a starting material for the production of flavor drinks and ice creams. As the result, every product was scarce in throat-catching sensation and excellent in flavor. Thus, it was recognized that the aforesaid defatted soybean milk powder was excellent in quality as a substitute for skim milk powder.

EXAMPLE 7

The soybean milk obtained in Example 2 was incorporated with 0.5 weight % of calcium sulfate as a coagulant, and coagulated at 70° C. to produce tofu. This tofu was more excellent in quality and more smooth in mouth feel than tofu obtained in the same manner as above, except that the glucono-1,5-lactone was not used.

EXAMPLE 8

1 Kilogram of whole soybeans were soaked in 2 l of a 2% aqoeous glucono-1,5-lactone solution. At the stage where the soybeans had absorbed the solution in an amount of 10% by weight based on the weight of the soybeans, the soybeans were freed from excess aqueous glucono-1,5-lacton solution, flattened according to an ordinary procedure, extracted with hexane at 60° C. and then dried to obtain defatted soybean high in content of unmodified protein. To this defatted soybean was added 10 times the weight thereof of a dilute aqueous NaOH solution, and the resulting mixture was ground (pH8.0), subjected to extraction of protein at room temperature for 2 hours and then freed from insolubles by centrifugation. The supernatant was further supplemented with 0.02% (W/V) of glucono-1,5-lactone and adjusted to pH 4.3 to isoelectrically precipitate the soybean protein, which was then recovered and spray-dried according to an ordinary procedure to obtain an isolated soybean protein powder. Since this powder contains glucono-1,5-lactone, the activity of β-glycosidase is inhibited even when water is added thereto at the time of producing beverages or foods by use of said powder.

1 Part (by weight) of the isolated soybean protein powder obtained in the above manner was mixed with 3 parts of a skim milk powder, and the resulting mixture was used as a starting material for the production of ice creams and flavor drinks. As the result, every product was scarce in throat-catching sensation and smooth in mouth feel. Thus, it was recognized that the aforesaid isolated soybean protein powder was excellent in quality.

Using the said isolated soybean protein powder, tofu was produced in the same manner as in Example 7. The thus produced tofu was smooth in mouth feel.

Example 9

1 Kilogram of whole soybeans were swelled by soaking of 8 hours in 2 liters of an aqueous solution containing 1.5 g. of glucono-1,5-lactone. The resulting soaked soybeans was subjected to heat treatment with an extruder at 165° C for 30 sec. under a saturated steam of 6 kg/cm² (gauge), sufficiently washed with a dilute aqueous hydrochloric acid solution (pH 4.5) to remove other components than the protein, and then dried to obtain soybean protein concentrates. This protein was partially hydrolyzed with pepsin, neutralized with $Na_2CO_3$, and then dried. Thus obtained material was used as a starting material for the production of ice creams and flavor drinks. As the result, every product was extremely low in throat-catching sensation and was smooth in mouth feel.

What is claimed is:

1. In a method of processing soybeans to extract soybean protein which method comprises contacting whole or hulled soybeans with water, the improvement comprising reducing the throat catching sensation of the extracted soybean protein by including in said water a competitive inhibitor for β-glycosidase selected from the group consisting of aldonic lactones and Nojirimycin.

2. In a process of treating soybeans to extract soybean protein therefrom wherein whole or hulled soybeans are subject to mechanical destruction of tissues thereof, the improvement comprising reducing the throat catching sensation of said soybean protein by conducting the mechanical destruction in the presence of an aqueous solution of a competitive inhibitor for β-glycosidase selected from the group consisting of aldonic lactones and Nojirimycin.

3. A method according to claim 1 wherein said competitive inhibitor is Nojirimycin.

4. A method according to claim 1 wherein said competitive inhibitor is an aldonic lactone.

5. A method according to claim 4 wherein said aldonic lactone is at least one member selected from the group consisting of 0.1 to 2% by weight of glucono-1, 5-lactone, 0.02 to 2% by weight of fucono-1, 5-lactone and 20 to 40% by weight of galactono-1, 5-lactone, the amount of said lactones being based on the weight of the soybeans.

6. A method according to claim 1, wherein said whole or hulled soybeans are soaked in water at a temperature of 0° to 80° C.

7. A soybean product prepared from soybean protein produced by the method according to claim 1.

8. A method according to claim 1, wherein the whole or hulled soybeans are soaked in water containing the competitive inhibitor for β-glycosidase, thereby impregnating the soybeans with said competitive inhibitor, the impregnated soybeans are ground in the presence of 5 to 15 times the weight thereof of water, and the active β-glycosidase in the ground soybeans is completely heat activated.

9. A method according to claim 2 wherein the competitive inhibitor is an aldonic lactone.

10. A method according to claim 2 wherein the competitive inhibitor is Nojirimycin.

11. A method according to claim 2, wherein the mechanical destruction of soybean tissue is carried out at a temperature of 0° to 80° C.

12. A method accordng to claim 9, wherein the aldonic lactone is at least one member selected from the group consisting of 0.1 to 2% by weight of glucono-1, 5-lactone, 0.02 to 2% by weight of fucono-1, 5-lactone and 20 to 40% by weight of galactono-1, 5-lactone, the amount of said lactones being based on the weight of the soybeans.

13. A method according to claim 1, wherein the whole or hulled soybeans are soaked in water containing the competitive inhibitor for β-glycosidase, thereby impregnating the soybeans with said competitive inhibitor, the impregnated soybeans are flattened or mealed and then subjected to defatting treatment using hexane, and the resulting defatted soybeans are ground in the presence of 5 to 15 times by weight of water based on the weight of the defatted soybeans.

14. A process according to claim 13 wherein said defatted soybeans are soaked in water prior to being ground.

15. A method for producing soybean milk with reduced throat catching sensation by competitively inhibiting the β-glycosidase which comprises soaking whole soybeans or hulled soybeans in an aqueous solution containing 0.1 to 2% by weight of glucono-1, 5-lactone, based on the weight of the soybeans, thereby to swell the soybeans, grinding the swelled soybeans in water, which is about 5 to 15 times the weight of soybeans, and then filtering the ground soybeans to obtain soybean milk.

16. a soybean milk prepared from soybean protein produced by the method according to claim 2.

* * * * *